US008423519B2

(12) United States Patent
Tofano (10) Patent No.: US 8,423,519 B2
(45) Date of Patent: Apr. 16, 2013

(54) DATA REDUCTION INDEXING

(76) Inventor: Jeffrey Vincent Tofano, San Jose, CA (US)

( * ) Notice: Subject to any disclaimer, the term of this patent is extended or adjusted under 35 U.S.C. 154(b) by 0 days.

(21) Appl. No.: 13/036,091

(22) Filed: Feb. 28, 2011

(65) Prior Publication Data

US 2011/0218972 A1 Sep. 8, 2011

(30) Foreign Application Priority Data

Mar. 8, 2010 (AU) .................................. 2010200866

(51) Int. Cl.
*G06F 17/30* (2006.01)
(52) U.S. Cl.
USPC .......................................................... 707/692
(58) Field of Classification Search ........................ None
See application file for complete search history.

(56) References Cited

U.S. PATENT DOCUMENTS

| 7,222,079 | B1* | 5/2007 | Seare et al. ...................... 705/3 |
| 2009/0187546 | A1* | 7/2009 | Hamilton Whyte ............... 707/3 |
| 2009/0300321 | A1* | 12/2009 | Balachandran et al. ...... 711/216 |
| 2010/0123607 | A1* | 5/2010 | He et al. .......................... 341/51 |
| 2011/0055471 | A1* | 3/2011 | Thatcher et al. ............. 711/114 |
| 2011/0099154 | A1* | 4/2011 | Maydew et al. ............. 707/692 |

OTHER PUBLICATIONS

Australian Government, IP Australia, Examiner's First Report on Patent Application No. 2010200866 (dated May 24, 2010) having a filing date of Mar. 3, 2010 (3 pgs).
Yang et al., "DEBAR: A Scalable High-Performance De-duplication Storage System for Backup and Archiving," Computer Science and Engineering Department of CSE Technical Reports, University of Nebraska—Lincoln 2009, URL: <http://digitalcommons.unl.edu/cgi/viewcontent/cgi?article=1059&context=csetechreports> (20 pgs).
Macko et al., "Tracking Back References in a Write-Anywhere File System," Feb. 18, 2010, URL: <http://dash.harvard.edu/handle/1/3660593?show=full> (14 pgs).

* cited by examiner

*Primary Examiner* — Bai D. Vu (57) ABSTRACT

Example apparatus, methods, data structures, and computers control indexing to facilitate duplicate determinations. One example method includes indexing, in a global index, a unique chunk processed by a data de-duplicator. Indexing the unique chunk in the global index can include updating an expedited data structure associated with the global index. The example method can also include selectively indexing, in a temporal index, a relationship chunk processed by the data de-duplicator. The relationship chunk is a chunk that is related to another chunk processed by the data de-duplicator by sequence, storage location, and/or similarity hash value. Indexing the relationship chunk in the temporal index can also include updating one or more expedited data structures associated with the temporal index. The expedited data structures and indexes can then be consulted to resolve a duplicate determination being made by a data reducer.

18 Claims, 9 Drawing Sheets

DATA REDUCTION INDEXING

CROSS-REFERENCE TO RELATED APPLICATIONS

This application claims priority to Australian Patent Application No. 2010200866 filed on Mar. 8, 2010, the disclosure of which is incorporated herein by reference in its entirety.

BACKGROUND

Data can be stored and data can be transmitted. Storing data takes time and space while transmitting data takes time and bandwidth. Both storing and transmitting data cost money. Yet more and more data is being generated every day. Indeed, the rate at which the amount of data is expanding may be exceeding the rate at which storage space and transmission bandwidth are growing. Furthermore, while the amount of data to be stored and/or transmitted is growing, the amount of time available to store and/or transmit data remains constant. Therefore, efforts have been made to reduce the time, space, and bandwidth required to store and/or transmit data. These efforts are referred to as data reduction.

Data reduction includes data deduplication, data protection, and data management. Data deduplication may be referred to as "dedupe" or "deduping". Dedupe for data storage initially relied on the fact that a larger piece of data can be represented by a smaller piece of data called a fingerprint. The fingerprint can be, for example, a hash. By way of illustration, a 1 kilobyte (KB, $1\times10^3$ bytes) block of data may be uniquely identified by a 128 bit cryptographic hash. Sophisticated techniques for computing hashes of different widths and with different security have been developed. These techniques have been applied to fixed and variable sized blocks of data.

Dedupe for data storage also relied on the fact that much data that is stored has already been stored. If data has already been stored, then it does not have to be stored again. Instead of storing a copy of a block of data that is already stored, a record that identifies and facilitates locating the previously stored block can be stored. The record may be significantly smaller than the block of data. The record can include the fingerprint hash and other information. Data reduction involves both breaking a larger piece of data into smaller pieces of data, which can be referred to as "chunking", and producing the unique identifier, which can be performed by hashing. Reaping the rewards of clever chunking and hashing depends on being able to accurately and efficiently locate chunks of data and hashes for the chunks of data.

Conventionally, determining whether a chunk of data was a duplicate included comparing chunks of data byte-by-byte. To compare a chunk, it had to be accessible, which may have required an input/output (I/O) operation. I/O operations can be a bottleneck in certain types of processing. After dedupe chunking and hashing, determining whether a chunk of data is a duplicate could include comparing fingerprints (e.g., hashes) instead of comparing chunks of data byte-by-byte. Comparing 128 bit hashes, or other sized hashes, can be more efficient than comparing chunks (e.g., 1 KB, 128 KB) of data byte-by-byte. Like comparing blocks requires the blocks to be available, comparing fingerprints requires having the fingerprints available. Having a fingerprint available involves finding a fingerprint. Finding a fingerprint depends on intelligent indexing. However, indexing should not consume so much additional memory that an inordinate amount of the space saved through data reduction is spent on indexing.

Data reduction for data transmission also initially relied on the fact that a large piece of data that can be represented by its smaller fingerprint can, in effect, be transmitted by transmitting the fingerprint to a system that already has the large piece of data and a way to correlate the fingerprint to the large piece of data. The correlation has typically been made by storing fingerprints in a single global index, which may have negatively impacted searching and retrieving fingerprints.

Dedupe can be applied to aggregations of data (e.g., files) that can be partitioned into smaller parts (e.g., chunks, subchunks). The smaller parts may be arranged into a hierarchy. A hash can be computed and stored for each unique block seen by a dedupe process or apparatus. Determining whether to store and/or transmit a just processed chunk depends on determining whether the chunk has been previously hashed, stored, and/or transmitted. If the chunk has already been stored, then to store the aggregation there is no need to store the duplicate chunk again, there is only a need to record with the structure from which the aggregate will be recreated the fact that that the chunk is stored and where the chunk is stored. If the chunk has already been transmitted, and if the chunk is stored at the receiving site, then there is no need to transmit the whole chunk again. Uniquely identifying information (e.g., fingerprint hash) can be transmitted thereby reducing the amount of data transmitted.

Determining whether a chunk has been previously hashed, stored, and/or transmitted involves comparing hashes. Efficiently comparing hashes involves efficiently finding hashes, which involves prior attention to indexing. As data sets grow ever larger, as work becomes ever more distributed, and as large files are more routinely stored, transmitted, and archived, issues associated with indexing hashes become larger and larger.

Consider the following transmission and storage nightmare scenario. Imagine twenty people are all collaborating on authoring and editing a scientific paper that has one hundred pages of text, twenty embedded formulae, ten embedded photographs, two embedded video segments, and fifteen slides. The entire paper is fifty megabytes (MB) in size. The paper is attached to an email and distributed to the entire group. If the entire file is actually transmitted to each person, then 20×50 MB of data (1,000 MB, 1 GB) is transmitted. If each person stores the 50 MB file, then 1 GB of data is stored. Just for the twenty copies of the identical file.

Now consider that different members of the group will mark up different versions of the paper, save their markup copy, and then email the marked up copy to individuals and/or to the entire group. This can happen over and over. Some of the marked up versions may only change the text in one controversial sentence, while other marked up versions may merely substitute one photograph for another photograph. As the deadline for publishing the paper draws near, the paper may be transmitted back and forth several times a day. Conventionally this would consume many gigabytes of transmission bandwidth and many gigabytes of storage. Now assume that on the day before publication the final version of the paper and all its predecessors is distributed to an entire organization having 1,000 people. The bandwidth required to transmit these mostly duplicate versions is enormous. The memory consumed storing the emails is also enormous. And yet most of the transmission bandwidth consumed and most of the memory consumed is consumed by duplicates. While the entire document may not be identical, substantial portions of the document may be unchanged from the original, and substantial portions may have become settled after one or two rounds of editing. The storage issue is multiplied when the emails are backed up or archived.

Data reducing facilitates reducing transmission bandwidth and storage space consumed, both primary, near-line, and archival. However, data reducing depends on determining whether all or some of an object that you are considering transmitting, storing, and/or archiving duplicates all and/or some of a previously transmitted, stored, and/or archived object. The decision concerning whether an object is a duplicate may be made inline when considering transmission and may be made during post processing when considering how to reduce the amount of data stored and/or archived. Regardless of when the decision is made, at some point a determination needs to be made concerning whether an object is a duplicate. Intelligent indexing of hashes and other information associated with stored data facilitates efficiently decided whether an object is a duplicate.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Perhaps the easiest way to determine whether an object has duplicate chunks that have already been hashed and stored is to examine metadata carried around by the object. For example, an object (e.g., file) may be self-aware to the point of knowing that it has previously been processed by a data reducer (e.g., chunker and hasher) and that it was chunked in a certain way, hashed in a certain way, and had the chunks and hashes stored in a known set of locations. In another example, an object may know that it was previously processed by a data reducer, that it was chunked and hashed, and that ninety nine out of one hundred of its chunks were found to be duplicates. These types of files may carry around metadata that says, for example, my first chunk starts at byte 0, ends at byte 2047, was last stored at disk location X, and has a hash value of Y that was last stored in index Z at location W. However, not all data to be transmitted and/or stored may be so self aware and so helpful. In these cases, an index or a set of indexes may be consulted to determine whether a chunk is a duplicate. The determination may be based on whether a just-computed hash can be found in an index or set of indexes.

If there were only a small number of stored objects and thus only a small number of chunks, then a simple index could be used to store the hashes and pointers to the actual chunks. Additionally, simple search routines could be used to search the index. However, a very large number (e.g., trillions) of objects that may be large (e.g., 100 MB) and complicated (e.g., mixed media) may be stored. While a global index will still be used, and while hashes and pointers to actual data will still be stored in the global index, example apparatus and methods may treat the global index as "the index of last resort". Example apparatus and methods may maintain additional temporal indexes that facilitate locating a hash and/or underlying unique data more quickly than is possible through searching the global index. The temporal indexes may form an ordered set of optimizations that allow resolving duplications without visiting the global index. Additionally, "hints" concerning where to look for a hash may be maintained. The temporal indexes allow efficient searches on multiple criteria, where the efficiencies involve storage space and search time. The temporal indexes may store fewer hashes than the global index. The temporal index may therefore be smaller and more efficient.

To understand why temporal indexes are maintained, consider a one terabyte (TB, $1 \times 10^{12}$ bytes) data set. If a data reducing chunker produces chunks with an average size of 1 kilobyte (KB, $1 \times 10^3$ bytes), then a complete index may have approximately $1 \times 10^9$ entries. An index entry may include a hash (e.g., 128 bit hash), a pointer to where the actual data in the chunk is stored (e.g., disk, tape, main memory), and other information (e.g., chunk strategy identifier, hash algorithm identifier, hints). Searching an index having $1 \times 10^9$ entries is a non-trivial task and may not be possible in a time frame relevant to a transmission environment. Now consider a one petabyte (PB, $1 \times 10^{15}$ byte) data set. If the data reducing chunker produces chunks with an average size of 1 KB, then there may be approximately $1 \times 10^{12}$ index entries. Once again, searching an index having $1 \times 10^{12}$ entries is not a trivial task and may not be completed in a relevant time frame.

Returning to the fifty MB email attachment example, the chunks and hashes for the original version will be stored somewhere (e.g., disk, tape) at least once. However, when data reduction is used, chunks and hashes may not be stored for every piece of every version being emailed back and forth. Instead, when there are duplicate chunks, data about which duplicate chunks and about which non-duplicate chunks make up a version may be stored rather than storing the duplicates. Therefore, identifying information (e.g., hash) may be transmitted and stored rather than an entire chunk. A file system may not store a complete copy of a file, but instead may store information about how to reconstruct the file by assembling its chunks. Some chunks may be referred to by pointers, some chunks may be identified by hashes, and some chunks may be actual data. When a non-duplicate chunk is encountered, the data for the non-duplicate chunk will be stored, and a hash and locating information will also be stored in an index.

When an object to be transmitted and/or stored is processed, it may be chunked and hashed. Before being transmitted and/or stored, a determination about whether the chunk is a duplicate can be made. The determination can be made based on information stored in one or more indexes.

Searching an index can therefore provide at least two pieces of information. First, if an index stores a hash that matches the hash for the chunk that has just been processed by the data reducer, then the chunk is a duplicate, the chunk does not need to be stored, and the chunk does not need to be transmitted. Instead, the hash can be transmitted, and/or information concerning how to find the data associated with the duplicate chunk can be stored. Second, searching the index can provide information on how to find the actual chunk of data. An index can also return additional context upon which intelligent subsequent searches can be based (e.g. hints for refining subsequent searches).

Figure 1:
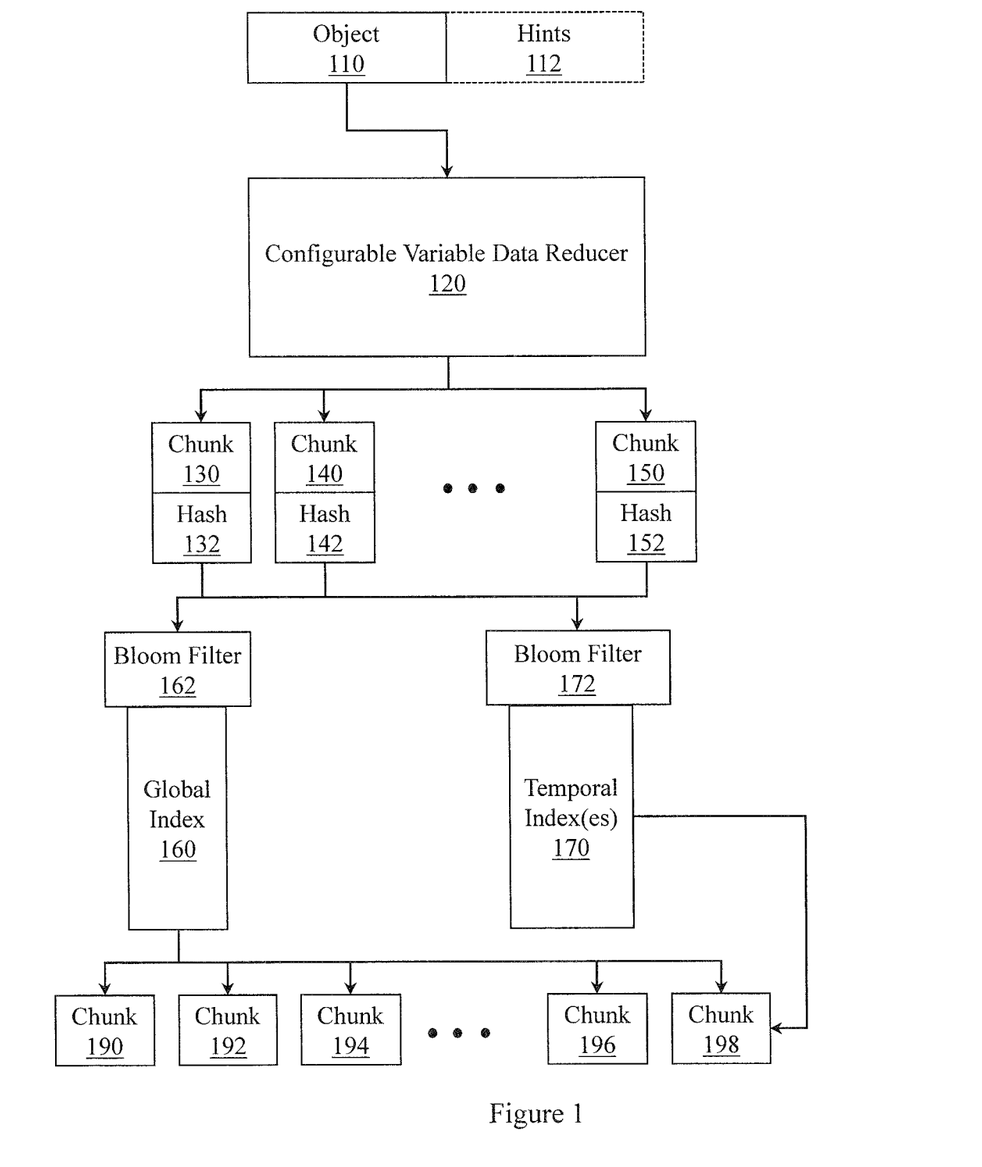
FIG. 1 illustrates a dedupe environment.

FIG. 1 illustrates an object 110 that is presented to a configurable variable data reducer 120. Hints 112 may be associated with the object 110. The hints 112 may provide information concerning whether object 110 has been data reduced before and, if so, may provide additional information including, but not limited to, chunk boundaries, chunk size, hashes, index locations, storage locations, chunk strategies, and hashing strategies. Chunks 190, 192, 194 . . . 196, and 198 represent the chunks that have been chunked, hashed, indexed, and stored. These chunks may be stored on disk, on tape, or on other storage devices. In one example, a global index 160 may have an entry for every chunk that has been hashed and stored. The entry may include a hash for a chunk and information for locating the stored chunk. The information may provide context useful for locating data on a storage medium.

The configurable variable data reducer 120 can chunk and hash the object 110 into, for example, chunks 130, 140 . . . 150 and hashes 132, 142 . . . 152. Once the chunks and hashes have been computed, an example apparatus and/or method may determine whether a chunk is a duplicate. The determination may be based on information available in global index 160 and/or in temporal indexes 170. If the chunk is not a duplicate, then the original chunk data may be stored and the corresponding hash may be indexed. If the chunk is a duplicate, then there may be no need to store the original chunk data. Once the index has provided information about whether a chunk is a duplicate, then a decision may be made concerning storing the chunk.

An alternative method for determining whether a chunk is a duplicate is to search global index 160 for a match for a hash for the chunk. Hash values may be a primary key and/or a portion of a primary key for global index 160. The global index 160 can be stored, for example, as a tree, as a hash tree, or as another structure. If the hash is in the global index 160, then the chunk is likely a duplicate. If the hash is not in the global index 160, then the chunk is likely not a duplicate. However, as described above, searching a global index associated with a very large data set may be time consuming. Therefore, example apparatus and methods may provide additional data structures and data processing techniques for determining whether a chunk is a duplicate.

One data structure and data processing technique involves a Bloom filter 162. One skilled in the art understands that a Bloom filter can quickly and reliably determine that an item is not in a data structure protected by the Bloom filter. Bloom filters can include, for example, standard Blooms, counting Blooms, and so on. Therefore, Bloom filter 162 can quickly determine whether a hash is not located in global index 160. One skilled in the art will also understand that Bloom filter 162 cannot unequivocally report that a hash is in global index 160, even though Bloom filter 162 can unequivocally report that a hash is not in global index 160. One skilled in the art will appreciate that other filters, data structures, processes, and so on, may provide functionality for determining whether an item is located in an index. These filters and data structures may be referred to as "expedited data structures". One example expedited data structure is a bitmap.

If the Bloom filter 162 or other expedited data structures do not unequivocally report that the hash is not in global index 160, then global index 160 may be searched. Global index 160 may be partitioned to facilitate searching. One skilled in the art will appreciate that an index can be partitioned in different ways including, for example, range partitioning, list partition, hash based partitioning, and composite partitioning. In one example, the global index 160 is partitioned so that bits in a hash select the index partition. While a single Bloom filter 162 is illustrated, in one example, when global index 160 is partitioned, an individual partition may have its own Bloom filter. Similarly, while a single Bloom filter 162 is illustrated, one skilled in the art will appreciate that other expedited data structures may be employed.

FIG. 1 also illustrates temporal index(es) 170 and Bloom filter 172. Once again, while a Bloom filter 172 is illustrated, other expedited data structures may be employed. The temporal index(es) 170 are an ordered set of optimizations that may allow resolving duplications without visiting the global index 160. The temporal index(es) 170 are places to look for information that helps determining whether a chunk processed by the configurable variable data reducer 120 is a duplicate. The temporal index(es) 170 can store hashes that can be compared to hashes from processed chunks. The temporal index(es) 170 can be protected by a Bloom filter 172 or other expedited data structures. Once again, the Bloom filter 172 or other expedited data structures can accurately and efficiently report that a hash is not in one of the temporal index(es) 170, but may not completely reliably report that a hash is in one of the temporal index(es). However, knowing that a hash is not in one of the temporal index(es) 170 is valuable information. Therefore, before searching one of the temporal index(es) 170 for a hash, example apparatus and methods may first consult Bloom filter 172, which can report with absolute certainty when a hash is not in one of the temporal index(es) 170. If the hash is unequivocally not in one of the temporal index(es) 170, then the temporal index (es) will not be searched. While a single Bloom filter 172 is illustrated, when the temporal index(es) 170 are partitioned, an individual partition may have its own Bloom filter and/or other expedited data structures.

If the Bloom filter 172 or other expedited data structures cannot report unequivocally that the hash is not in one of the temporal index(es) 170, then the temporal index(es) 170 may be searched. The temporal index(es) 170 can be partitioned. In one example the temporal index(es) 170 are partitioned so that bits in a hash select the index partition. The temporal index(es) 170 can be arranged as a tree, as a hash tree, or as other data structures. An entry in the temporal index(es) 170 will include a hash value and other information. The other information may include, for example, a location context, or information for locating the corresponding entry in the global index 160.

The temporal index(es) 170 can include, for example, a sequence index, a location index, a relation index, or other location context. Members of the temporal index(es) 170 can have their own Bloom filter or other expedited data structure. Additionally, when a member of the temporal index(es) 170 is partitioned, a partition can have its own Bloom filter. Therefore, a quick and accurate determination that a chunk is not a duplicate can be made by first accessing the Bloom filter 162 and the Bloom filter(s) 172. When a chunk has been processed by the configurable variable data reducer 120, the chunk hash can be presented to the available Bloom filters or other expedited data structures. If all the available expedited data structures report that the hash is definitely not in their underlying data structure, then the chunk is not a duplicate. The chunk can therefore be stored and a location context indexed for the chunk. If, however, all the available Bloom filters cannot unequivocally report that the hash is definitely not in their underlying data structures, then the temporal index(es) 170 and the global index 160 may be searched. In one example, the searches may be performed in parallel. In one example, when multiple searches are undertaken in parallel, detecting a hit in a first search may lead to the other parallel searches being cancelled. A search can report a hit, meaning that the chunk is likely a duplicate. A search can also report a miss, meaning that the chunk is not in at least the index that was searched to produce the miss. Since the searches only proceed if the Bloom filters did not report an unequivocal miss, then at least one of the searches should report a hit. If the hash is not found in any of the temporal index(es) 170, it will be found in the global index 160.

The global index 160, the expedited filters, the Bloom filter 162, the temporal index(es) 170, and Bloom filter(s) 172 can be stored on a variety of different devices. For example, the indexes can be stored on a solid state drive (SSD) while the Bloom filters or other expedite data structures can be stored in memory. One skilled in the art will appreciate that different storage devices can be employed. One skilled in the art will also appreciate that different information may be stored on different devices in different locations.

The temporal index(es) 170 can include a sequence index, a location index, and a relation index. Thus, the temporal index(es) 170 may be more than one index. The sequence index stores information related to the order in which chunks have been stored, transmitted, and otherwise processed. Having a probabilistic view of which chunks are likely to be duplicates and which chunks are likely to not be duplicates can guide pre-fetching and index re-organization. By way of illustration, consider the email from the transmission and storage nightmare scenario. The first time the email is deduped, example apparatus and methods may realize that they are encountering new data. Example apparatus and methods may therefore store the new data, update the global index with location contexts, and update a sequence index with information about the order in which this collection of data was received. For example, a list of location contexts may be arranged in the sequence index. The next time the email is deduped, example apparatus and methods may determine that duplicate chunks are being processed, and may therefore consult the sequence index to see whether this particular sequence of chunks has been seen before. If it is likely that the sequence has been seen, then hashes and/or other information for chunks that appear later in a sequence can be pre-fetched. Pre-fetching the hashes can mitigate delays associated with input/output. Similarly, location contexts, and even the actual data associated with a chunk can be pre-fetched. As the emails that are sent back and forth are deduped over and over again, the sequence index may be re-ordered to make it more likely that the hashes and other information associated with the email message will be retrieved as efficiently as possible to allow a duplicate chunk decision to be made as efficiently as possible.

In one example, a sequence index logic may move hashes from a slower memory to a faster memory to improve search and match time. In another example, a sequence index logic may move hashes from a larger data structure to a smaller data structure to improve search and match time. Thus, as a sequence of chunks are seen over and over, example apparatus and methods may become adept at recognizing the sequence. As described above, a portion of the document being emailed back and forth may change and thus not every chunk in the sequence may be a duplicate. If the changes are localized to one or two chunks, then the sequence index may also recognize that out of the 50,000 chunks associated with the file there are 49,950 that are frequently duplicates and there are 50 that are frequently new.

The temporal index(es) 170 can also include a location index. Example apparatus and methods may store chunks that are received together in similar locations on memory devices (e.g., disk, tape). The chunks received together may be stored together as a function of a block write or sequential write, for example. Since the chunks were written as a block, when a member of the block is identified as being subjected to dedupe for transmission and/or storing, a block read can pre-fetch information about the neighboring chunks, which are related to the just processed chunk, as identified in the location index. The location index can store information identifying chunks that are stored together and identifying chunk data (e.g., hashes, location contexts) that are stored together. Then, when making a duplicate chunk decision, information about other chunks that are stored together can be pre-fetched to facilitate improving decision time.

Returning to the email attachment example, example apparatus and methods may, in addition to maintaining and using the sequence index, maintain and use a location index. Recall that the document included text, figures, slides, video, and photographs. The various pieces of the document may have been assembled from various locations. For example, the photographs may have been taken from a photo server, the video from a video server, and the text may have been typed in by the author. The photographs and slides may have been previously deduped. However, the newly created blocks of text may not have been deduped before, and then when deduped for the first time may have been stored in a similar location. When a subsequent version of the email is received, the version may have been re-organized so that the chunks no longer appear in the same sequence. Thus, when the sequence index may not produce efficiencies in pre-fetching, the location index may produce an efficiency, and vice versa. More generally, indexes in the temporal index may be employed for pre-fetching.

By way of illustration, a first chunk in a revised email may be hashed. The hash may be found in the location index. When the hash is found, information about other hashes and/or chunks that are stored nearby may be retrieved. When a subsequent chunk in the revised email is hashed and once again the hash is found in the location index and found to be located near the previous chunk and/or hash, then the location index may provide information about retrieving data (e.g., hashes, location contexts) concerning a collection of other chunks and/or hashes that are stored in the same location. The information may be pre-fetched, may be moved to faster memory, to a smaller data structure, to the head of a list of things to be searched when trying to match a hash, and may otherwise be used to improve the duplicate chunk decision.

The temporal index(es) 170 can also store a relation index. When a chunk is hashed, more than one hash may be produced. A first hash may be, for example, a strong, wide, cryptographic hash that uniquely identifies the chunk based on every byte in the chunk. This can also be referred to as the fingerprint or the fingerprint hash. A second hash may be computed that is not used for uniquely identifying the chunk. The second hash may be a similarity hash. While the similarity hash may not be suitable for uniquely identifying a chunk, the similarity hash may be suitable for determining whether a chunk is similar to another chunk. Two chunks may not be exactly alike, but they may be similar. For example, two chunks may differ in a single character, may differ in a contiguous set of characters, may differ in a repeating pattern of characters, and so on. Similar chunks may be stored together and hashes and/or location contexts associated with the chunks may be stored together. While a hash is described, one skilled in the art will appreciate that items other than hashes can be computed.

When trying to determine whether a chunk is a duplicate, example apparatus and methods may compute a fingerprint hash for uniquely identifying a chunk and may also compute a similarity hash. The two hashes may be computed in parallel. Since the similarity hash may be based on less than all the chunk data, the similarity hash may be computed before the fingerprint. In different examples the similarity hash may be computed based on a set of initial bytes in a chunk, a set of terminating bytes in a chunk, a set of bytes where uniquely identifying changes are likely, and other subsets of bytes. Like the sequence index and location index, the relation index stores information that potentially reduces the likelihood that an exhaustive search of global index 160 needs to be performed. Like the sequence index and location index, the relation index can also be protected by a Bloom filter or other expedited data structure. In one example, similarity vector processing can occur in parallel with queries to the global index 160 and/or other members of the temporal index(es) 170. Once again, while a hash is described, one skilled in the art will appreciate that other items may be computed.

Figure 2:
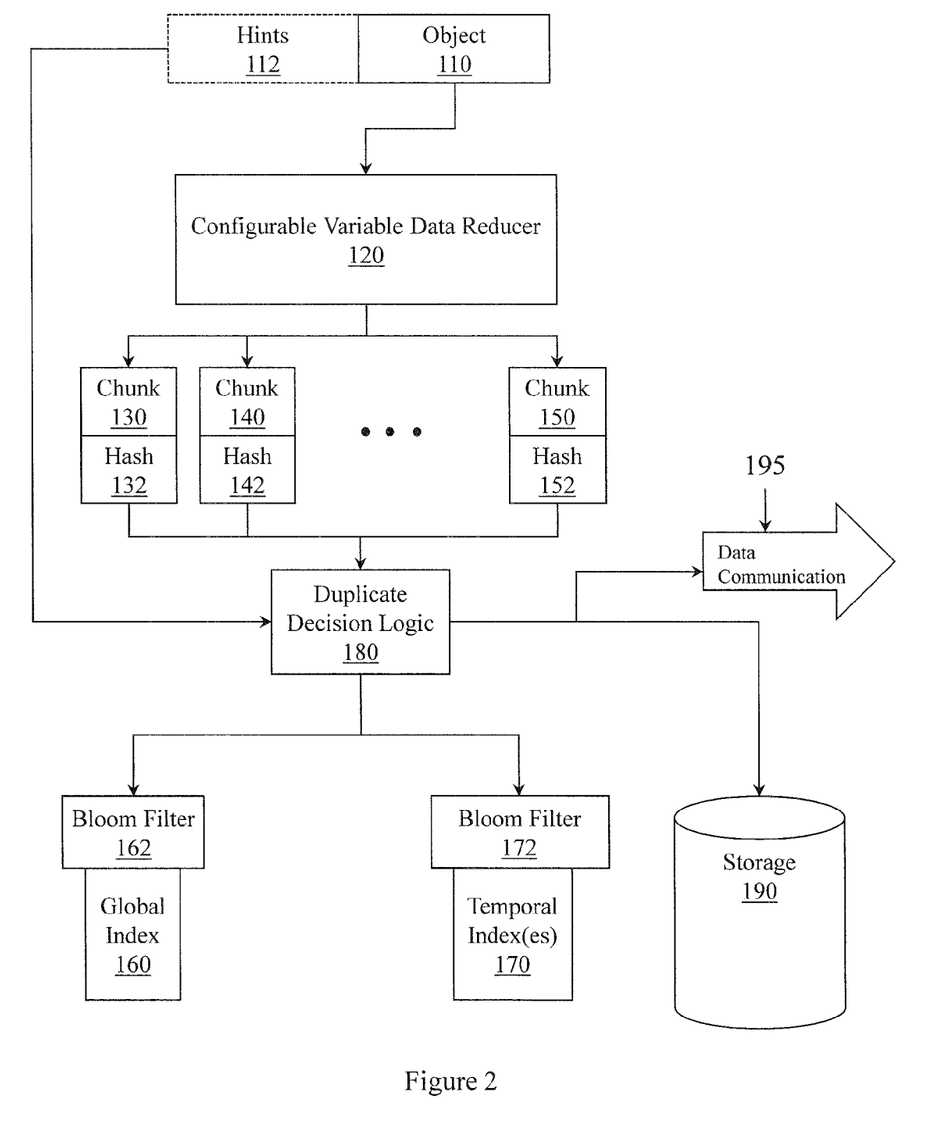
FIG. 2 illustrates an embodiment of an apparatus associated with making a duplicate determination and data reduction indexing.

FIG. 2 illustrates a duplicate decision logic 180. Duplicate decision logic 180 is consulted before a chunk is stored in a storage 190 or before a chunk is transmitted in a data communication 195. In one example, the duplicate decision logic 180 will not store duplicate chunks and will not transmit duplicate chunks. Instead of storing a duplicate chunk, the duplicate decision logic 180 may control an apparatus or file system to store information (e.g., a location context) that facilitates locating the stored chunk. Similarly, instead of transmitting a duplicate chunk, the duplicate decision logic 180 may control an apparatus to transmit information (e.g., hash value) that uniquely identifies a duplicate chunk.

Figure 3:
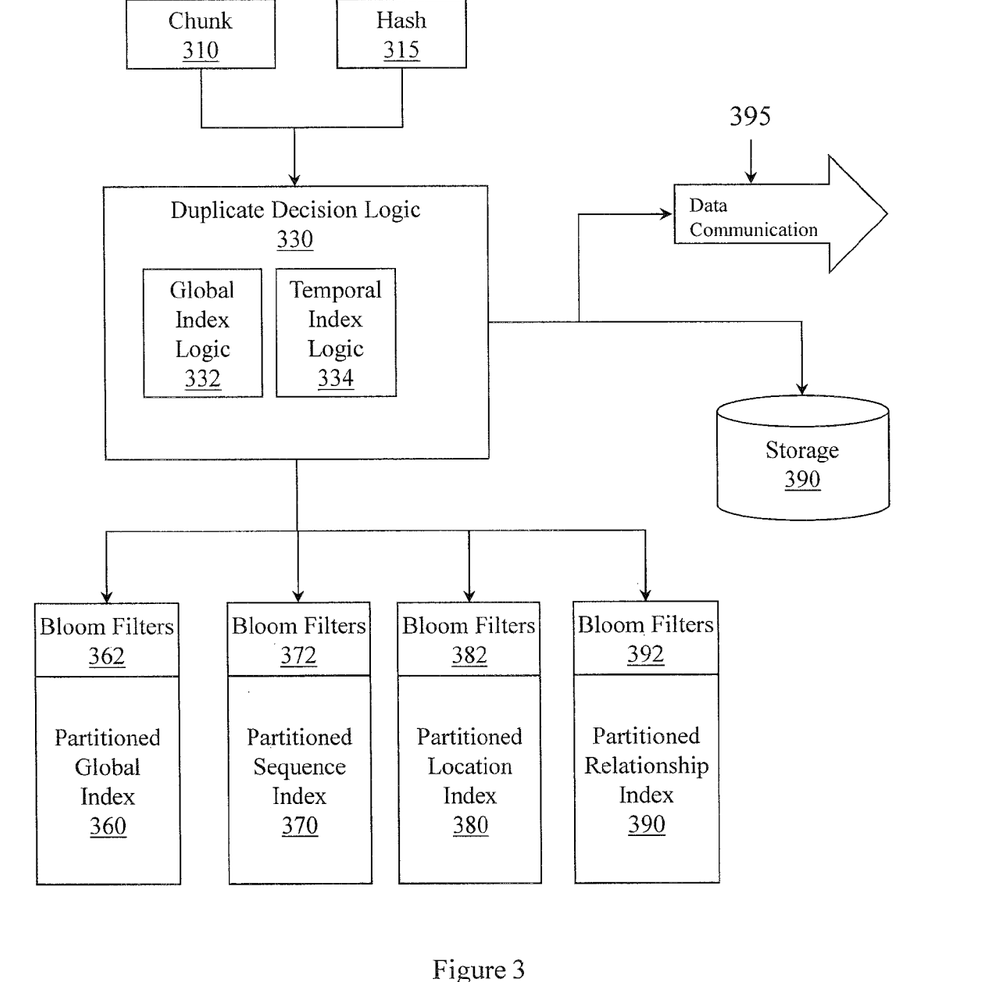
FIG. 3 illustrates an embodiment of an apparatus associated with making a duplicate determination and data reduction indexing.
Figure 7:
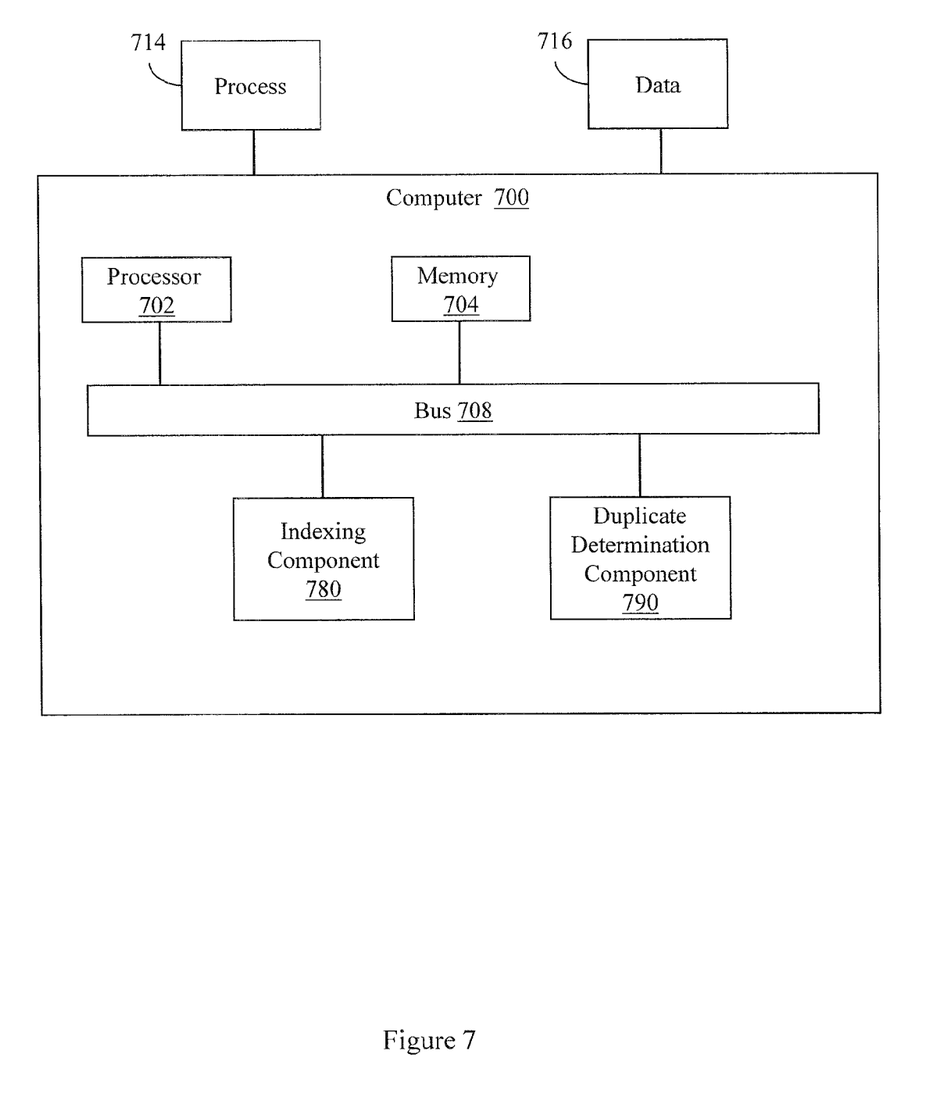
FIG. 7 illustrates an embodiment of a computer configured to interact with a data reduction index.

FIG. 3 illustrates a duplicate decision logic 330. Duplicate decision logic 330 may be an apparatus that includes a processor, a memory, and an interface that connects the processor, the memory, and a set of logics. One example apparatus is illustrated in FIG. 7. Duplicate decision logic 330 receives a chunk 310 and/or a hash 315 computed from the chunk 310. Duplicate decision logic 330 is tasked with determining whether the chunk 310 is a duplicate. This data reduction duplication determination can be associated with storing the chunk 310 in storage 390 and/or transmitting the chunk 310 via data communication 395.

Duplicate decision logic 330 includes a set of logics. The set of logics can include a global index logic 332 that is configured to store a set of location contexts in a global index 360. A location context may include, for example, a fingerprint hash, a portion of a fingerprint hash, a chunk location information, and a portion of chunk location information. In one example, a location context may be stored for every unique chunk encountered. Global index logic 332 is also configured to search the global index 360 for the hash 315 to facilitate resolving a data reduction duplicate determination.

The set of logics can also include a temporal index logic 334 that is configured to store an ordered set of optimizations in a temporal index. The temporal index logic 334 may also be configured to search the temporal index for the hash 315 to facilitate resolving the data reduction duplicate determination without accessing the global index 360.

In one example, the global index logic 332 may be configured to store the set of location contexts in the global index 360 as a hash tree whose primary key is a hash field. Similarly, the temporal index logic 334 can be configured to store the ordered set of optimizations in the temporal index as one or more hash trees.

In one example, the global index logic 332 may be configured to store the set of location contexts in the global index 360 in different partitions, making the global index 360 a partitioned global index. The partitions may be selectable as a function of a hash value or the location information. Similarly, the temporal index logic 334 may be configured to store the ordered set of optimizations in one or more partitioned indexes whose partitions are selectable as a function of a hash value or the location information.

The global index logic 332 can be configured to maintain one or more Bloom filters 362 to protect the global index. When the Bloom filters 362 are in place, the global index logic 332 will access the Bloom filters 362 before searching the global index 360 for the hash 315. Similarly, the temporal index logic 334 can be configured to maintain one or more Bloom filters (372, 382, 392) to protect the temporal index. When the Bloom filters (372, 382, 392) are in place, the temporal index logic 334 may access the Bloom filters (372, 382, 392) before searching the temporal index for the hash 315. While Bloom filters are illustrated, one skilled in the art will appreciate that other expedited data structures (e.g., bitmaps) may be employed.

In one example, the global index logic 332 can be configured to store in the global index 360 a location context for every unique chunk processed by a configurable variable data reducer associated with the data reduction. In one example, the global index logic 332 may be configured to selectively store chunk 310 on a storage device and to selectively store a location context in the global index 360 upon determining that the hash 315 is not stored in the global index 360 and therefore may be a unique chunk. The temporal index logic 334 can be configured to store less location contexts than are stored in the global index 360. Thus, the temporal index(es) can be smaller and more efficient than the global index 360.

The temporal index can include one or more indexes. Therefore the temporal index logic 334 can include one or more logics. In one example, the temporal index logic 334 includes a sequence logic that is configured to store, in a sequence index 370, sequence data describing sequence relationships between chunks processed by a data reducer. The sequence relationships concern the order in which related chunks are processed by the data reducer. The sequence logic can also be configured to selectively pre-fetch sequence based duplicate determination resolving data for potentially resolving the data reduction duplicate determination based on the sequence data. The sequence logic can also be configured to search the sequence index 370 for the hash 315. The sequence index 370 can be partitioned and can be protected by one or more Bloom filters 372 or other expedited data structures that are maintained by the temporal index logic 334 and/or the sequence logic.

The temporal index logic 334 can also include a location logic that is configured to store, in a location index 380, location data describing location relationships between chunks processed by the data reducer. The location relationships identify data stored in locations that can be pre-fetched together. The location logic can also be configured to selectively pre-fetch location based duplicate determination resolving data for potentially resolving the data reduction duplicate determination based on the location data. The location logic can also be configured to search the location index 380 for the hash 315. The location index 380 can be partitioned and can be protected by one or more Bloom filters 382 or other expedited data structures that are maintained by the temporal index logic 334.

The temporal index logic 334 can also include a relationship logic that is configured to store, in a relation index 390, similarity data describing similarity relationships between chunks processed by the data reducer. The similarity relationships identify chunks that are not identical but that satisfy a similarity threshold. The similarity threshold may be determined by a property of the relationship (e.g., comparison of similarity hash values, comparison of chunk metadata). The relationship logic can be configured to selectively pre-fetch similarity based duplicate determination resolving data for potentially resolving the data reduction duplicate determination based on the similarity data. The relationship logic can be configured to search the relation index 390 for the hash 315. The relation index 390 can be partitioned and can be protected by one or more Bloom filters 392 maintained by temporal index logic 334.

Figure 4:
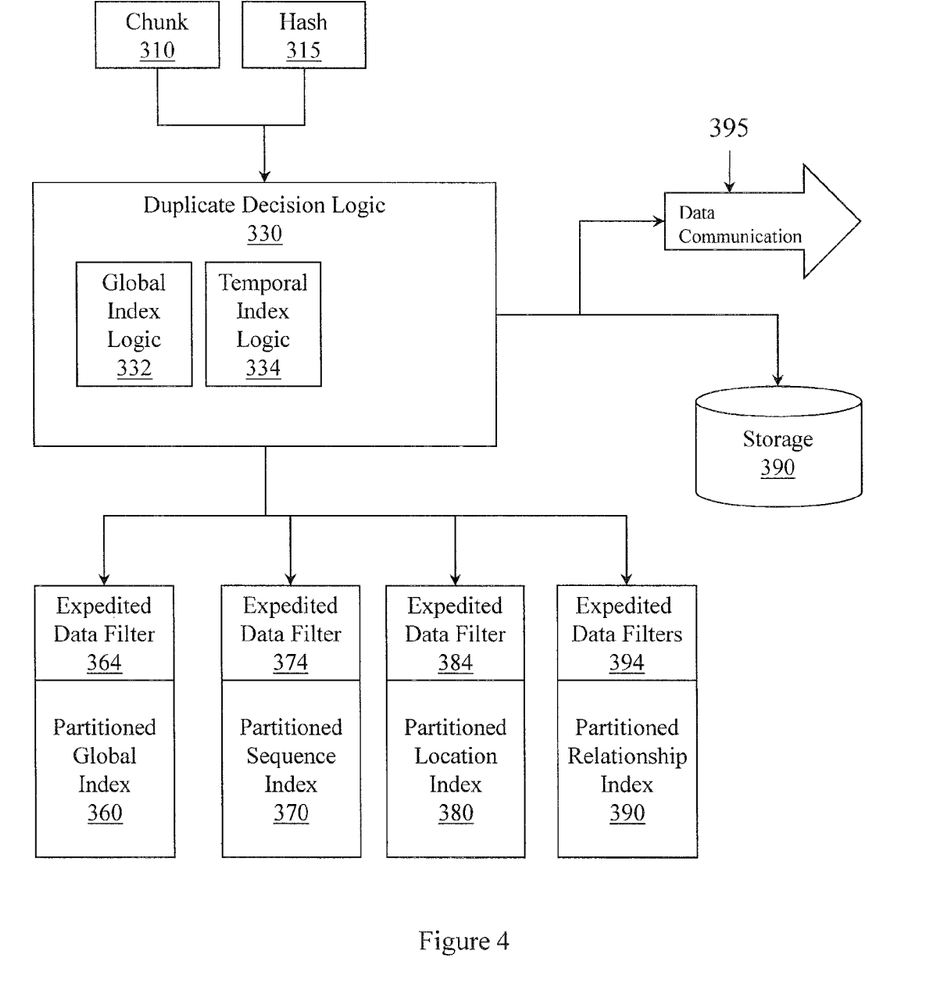
FIG. 4 illustrates an embodiment of an apparatus associated with making a duplicate determination and data reduction indexing.

FIG. 4 illustrates duplicate decision logic 330 interacting with expedited data filters 364, 374, 384, and 394 instead of with a Bloom filter. One skilled in the art will appreciate that an index can be "protected" by a variety of expedited data filters including, for example, a bitmap.

The following includes definitions of selected terms employed herein. The definitions include various examples and/or forms of components that fall within the scope of a team and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

"Logic", as used herein, includes but is not limited to hardware and firmware and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 5:
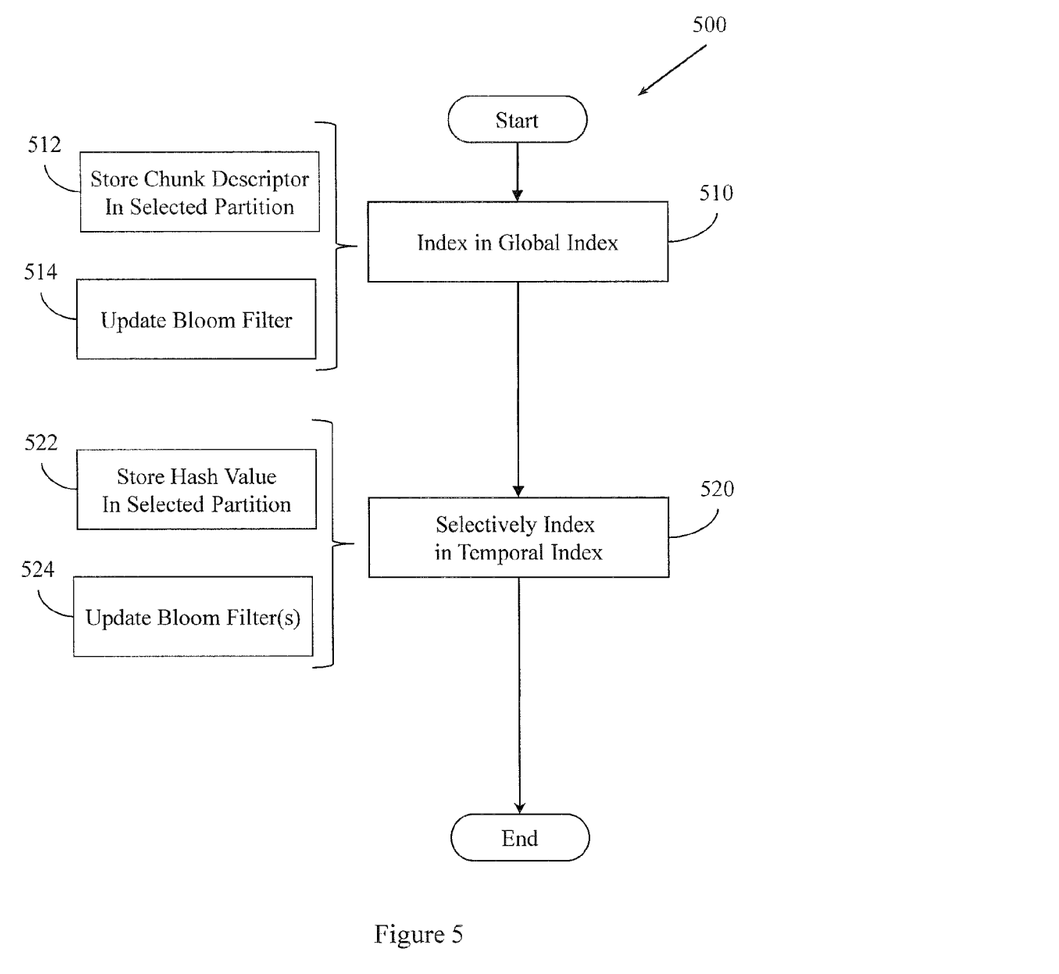
FIG. 5 illustrates a flowchart of a method associated with data reduction indexing.

FIG. 5 illustrates a method 500. Method 500 includes, at 510, indexing, in a global index, a unique chunk processed by a data de-duplicator. Indexing the unique chunk in the global index at 510 can include, at 512, storing a location context in a selected partition in the global index. The location context includes a hash value computed from the unique chunk and information identifying where the unique chunk is stored in a storage system accessible to the de-duplicator. The information may be, for example, a physical address, a logical address, and other identifying information.

Indexing the unique chunk in the global index at 510 can also include, at 514, updating a Bloom filter or other expedited data structure associated with the selected partition in the global index to include the hash value computed from the unique chunk.

Method 500 also includes, at 520, selectively indexing, in a temporal index, a relationship chunk processed by the data de-duplicator. The relationship chunk is a chunk that is related to another chunk processed by the data de-duplicator based on sequence, storage location, and/or similarity hash value. Selectively indexing the relationship chunk at 520 can include, at 522, storing a hash value computed from the relationship chunk in one or more of, a partitioned sequence index, a partitioned location index, and a partitioned relation index. Selectively indexing the relationship chunk at 520 can also include, at 524, updating one or more Bloom filters associated with the one or more partitions in the one or more indexes into which the hash value is stored to include the hash value computed from the relationship chunk.

In one example, a method may be implemented as computer executable instructions. Thus, in one example, a computer readable medium may store computer executable instructions that if executed by a computer (e.g., data reducer) cause the computer to perform method 500. While executable instructions associated with the above method are described as being stored on a computer readable medium, it is to be appreciated that executable instructions associated with other example methods described herein may also be stored on a computer readable medium.

"Computer readable medium", as used herein, refers to a medium that stores instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

Figure 6:
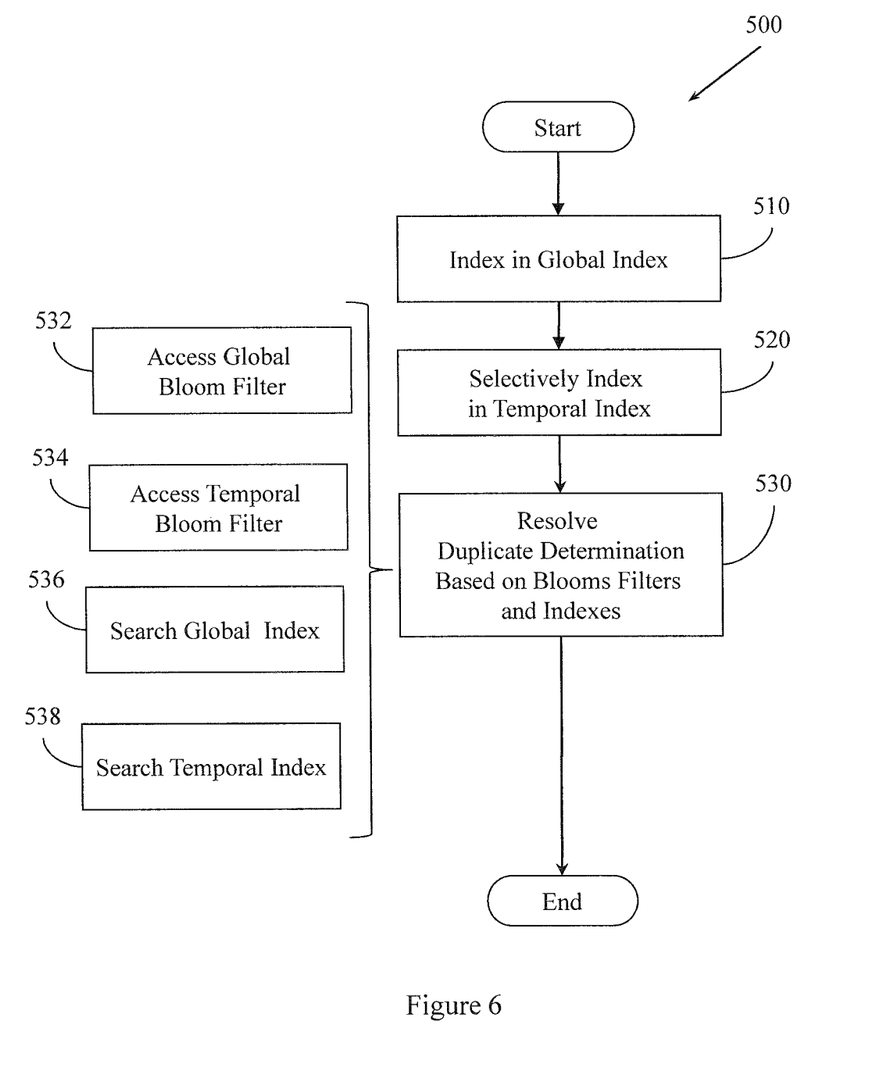
FIG. 6 illustrates a flowchart of a method associated with data reduction indexing.

FIG. 6 illustrates another embodiment of method 500 (FIG. 5). This embodiment of method 500 includes, at 530, resolving a duplicate determination based on whether a candidate hash is located in the temporal index and/or the global index. If the hash is found in at least one of the indexes, then the chunk is a duplicate. Before accessing the indexes, the resolving at 530 can include, at 532, accessing the global Bloom filter to determine whether the hash is not in the global index. Also before accessing the indexes, the resolving at 530 can include accessing, at 534, the temporal Bloom filters to determine whether the hash is not in the temporal indexes. If the Bloom filters cannot unequivocally determine that the hash is not in the indexes, then the global index may be searched at 536 and the temporal index searched at 538. One skilled in the art will appreciate that in one example the global index and the temporal index can be searched in parallel. One skilled in the art will also appreciate that an unequivocal determination in the temporal index can be used to terminate searching the global index and that an unequivocal determination in the global index can terminate searching the temporal index.

FIG. 7 illustrates a computer 700. Computer 700 includes a processor 702 and a memory 704 that are operably connected by a bus 708. In one example, the computer 700 may include an indexing component 780 and a duplicate determination component 790. The indexing component 780 may include, for example, a global index component as described above, and a temporal index component as described above. The duplicate determination component 790 may perform duplicate chunk determinations as described above.

Generally describing an example configuration of the computer 700, the processor 702 may be a variety of various processors including dual microprocessor and other multi-processor architectures. A memory 704 may include volatile memory (e.g., RAM (random access memory)) and/or non-volatile memory (e.g., ROM (read only memory)). The memory 704 can store a process 714 and/or a data 716, for example. The process 714 may be a data reduction process and the data 716 may be an object to be data reduced.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE (peripheral component interconnect express), 1394, USB (universal serial bus), Ethernet). The bus 708 can be types including, for example, a memory bus, a memory controller, a peripheral bus, an external bus, a crossbar switch, and/or a local bus.

Figure 8:
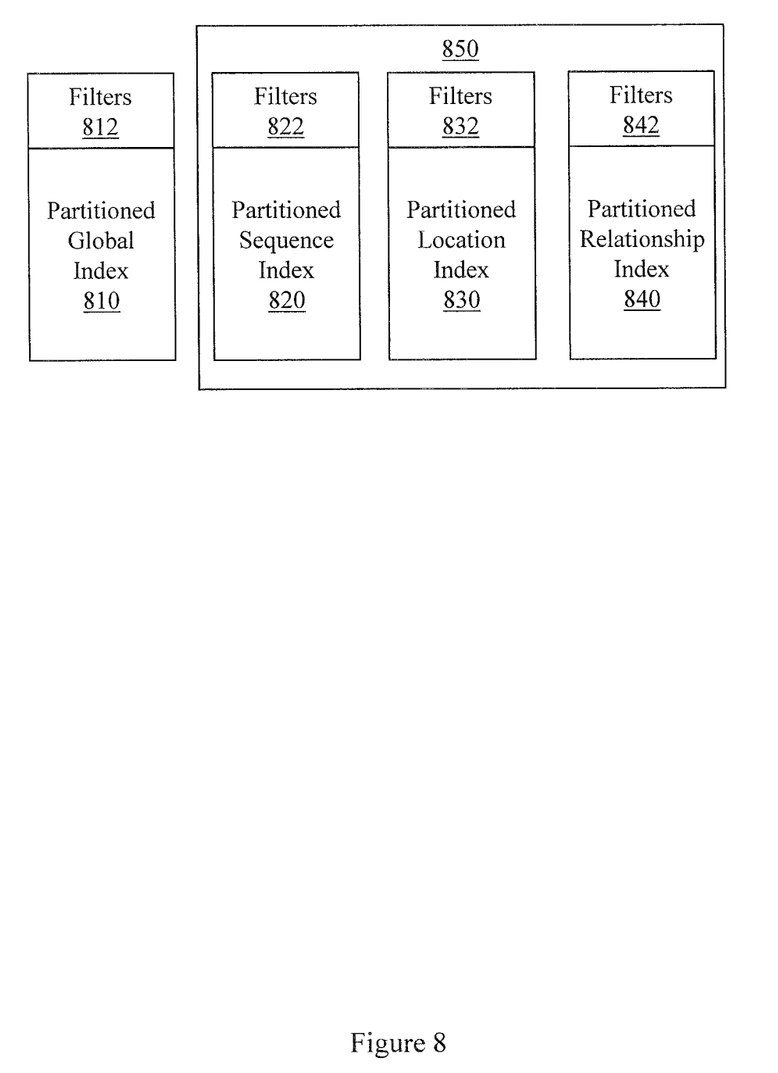
FIG. 8 illustrates data structures associated with duplicate determination indexing.

FIG. 8 illustrates data structures associated with duplicate determination indexing. The data structures include a global index 810. Global index 810 may store a complete set of location contexts associated with chunks processed by a data de-duplicator. In one example, the global index 810 is a hash tree whose primary key is a hash field. In one example the global index 810 is partitioned and partitions are selectable based on one or more bits in a hash value. In one example the global index 810 is protected by at least one Bloom filter 812 or other expedited data structure.

The data structures also include a temporal index 850. The temporal index 850 stores a subset of location contexts associated with chunks processed by the data de-duplicator. Instead of storing a complete set of location contexts, the temporal index 850 stores an ordered set of optimizations that facilitate resolving duplicate determinations without accessing the global index 810. The temporal index 850 may include a partitioned sequence index 820 arranged as a hash tree and protected by a Bloom filter 822 or other expedited data structure. The temporal index 850 may also include a partitioned location index 830 arranged as a hash tree and protected by a Bloom filter 832. The temporal index 850 may also include a partitioned relation index 840 arranged as a hash tree and protected by a Bloom filter 842.

Figure 9:
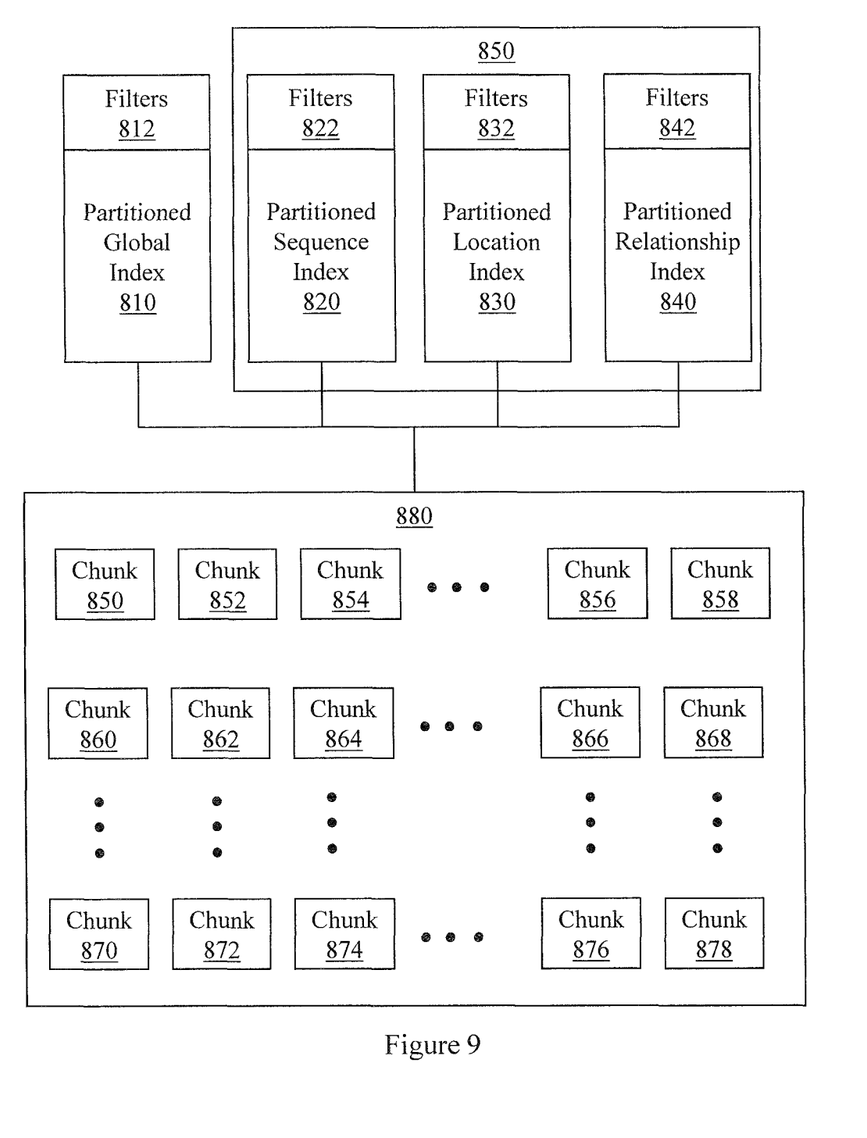
FIG. 9 illustrates data structures associated with duplicate determination indexing.

FIG. 9 illustrates data structures associated with duplicate determination indexing and chunks of data stored in data store 880. The data structures include the partitioned global index 810 and the temporal index 850 described in connection with FIG. 8. The global index 810 may store a location context for every chunk stored in data store 880. One skilled in the art will appreciate that data store 880 can be a disk, a tape, and other storage devices. One skilled in the art will also appreciate that data store 880 can be a single device or can be a distributed set of devices.

Data store 880 stores chunks that have been processed by a data reducer. The chunks include chunks 850, 852, 854, and 856 through 858, 860, 862, 864, and 866 through 868, and 870, 872, 874, and 876 through 878. While global index 810 can store a location context for every chunk in data store 880, the temporal index 850 stores fewer location contexts.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. An apparatus, comprising:
   a processor;
   a memory; and
   an interface that connects the processor, the memory, and a set of logics, the set of logics comprising:
   a global index logic configured to store a set of location contexts in a global index and to search the global index for a hash to resolve a data reduction duplicate determination, where a location context comprises at least a fingerprint hash and a chunk location information; and
   an ordered optimization index logic configured to store an ordered set of optimizations in an ordered optimization index and to search the ordered optimization index for the hash to resolve the data reduction duplicate determination without accessing the global index,
   where the global index is a searchable data structure, and
   where the ordered optimization index is a searchable data structure.

2. The apparatus of claim 1, where the global index logic is configured to store the set of location contexts in the global index arranged as a hash tree whose primary key is a hash field.

3. The apparatus of claim 2, where the ordered optimization index logic is configured to store the ordered set of optimizations in the ordered optimization index arranged as one or more hash trees.

4. The apparatus of claim 3, where the global index logic is configured to store the set of location contexts in the global index arranged as a partitioned index whose partitions are selectable as a function of a hash value.

5. The apparatus of claim 4, where the ordered optimization index logic is configured to store the ordered set of optimizations in one or more partitioned indexes whose partitions are selectable as a function of a hash value.

6. The apparatus of claim 5, where the global index logic is configured to maintain an expedited data structure to protect the global index and to access the expedited data structure before searching the global index for the hash.

7. The apparatus of claim 6, where the ordered optimization index logic is configured to maintain one or more expedited data structures to protect the ordered optimization index and to access the one or more expedited data structures before searching the ordered optimization index for the hash.

8. The apparatus of claim 1, where the global index logic is configured to store in the global index a location context for every unique chunk processed by a configurable variable data reducer associated with the data reduction.

9. The apparatus of claim 8, where the ordered optimization index logic is configured to store in the ordered optimization-index less location contexts than are stored in the global index.

10. The apparatus of claim 1:
where the ordered optimization index logic comprises a sequence logic configured to store, in a sequence index, sequence data describing sequence relationships between chunks processed by a data reducer, where the sequence relationships concern the order in which related chunks are processed by the data reducer;
where the sequence logic is configured to selectively pre-fetch sequence based duplicate determination resolving data for potentially resolving the data reduction duplicate determination based on the sequence data; and
where the sequence logic is configured to search the sequence index for the hash.

11. The apparatus of claim 1:
where the ordered optimization index logic comprises a location logic configured to store, in a location index, location data describing location relationships between chunks processed by a data reducer, where the location relationships identify data stored in locations that can be pre-fetched together;
where the location logic is configured to selectively pre-fetch location based duplicate determination resolving data for potentially resolving the data reduction duplicate determination based on the location data; and
where the location logic is configured to search the location index for the hash.

12. The apparatus of claim 1:
where the ordered optimization index logic comprises a relationship logic configured to store, in a relation index, similarity data describing similarity relationships between chunks processed by a data reducer, where the similarity relationships identify chunks that are not identical but that satisfy a similarity threshold as determined by a comparison of similarity hash values;
where the relationship logic is configured to selectively pre-fetch similarity based duplicate determination resolving data for potentially resolving the data reduction duplicate determination based on the similarity data; and
where the relationship logic is configured to search the relation index for the hash.

13. The apparatus of claim 10, where the ordered optimization index logic comprises:
a location logic configured to store, in a location index, location data describing location relationships between chunks processed by the data reducer, where the location relationships identify data stored in locations that can be pre-fetched together;
where the location logic is configured to selectively pre-fetch location based duplicate determination resolving data for potentially resolving the data reduction duplicate determination based on the location data; and
where the location logic is configured to search the location index for the hash; and
a relationship logic configured to store, in a relation index, similarity data describing similarity relationships between chunks processed by the data reducer, where the similarity relationships identify chunks that are not identical but that satisfy a similarity threshold as determined by a comparison of similarity hash values;
where the relationship logic is configured to selectively pre-fetch similarity based duplicate determination resolving data for potentially resolving the data reduction duplicate determination based on the similarity data; and
where the relationship logic is configured to search the relation index for the hash; and
where the ordered optimization index logic is configured to control one or more of the sequence logic, the location logic, and the relationship logic to search for the hash in parallel.

14. The apparatus of claim 1, where the data reduction duplication determination is associated with one or more of, a storage decision, and a transmission decision.

15. The apparatus of claim 1, the global index logic being configured to selectively store a chunk on a storage device and to selectively store a location context in the global index upon determining that the hash is not stored in the global index and therefore is a unique chunk.

16. An article of manufacture, comprising:
a non-transitory computer readable medium storing computer executable instructions that when executed by a computer control the computer to perform a method, the method comprising:
indexing, in a global index, a unique chunk processed by a data de-duplicator; and
selectively indexing, in a ordered optimization index, a relationship chunk processed by the data de-duplicator, where the relationship chunk is a chunk that is related to another chunk processed by the data de-duplicator by one or more of, sequence, storage location, and similarity hash value;
where indexing the unique chunk comprises:
storing a location context in a selected partition in the global index, the location context comprising a hash value computed from the unique chunk and information identifying where the unique chunk is stored in a storage system accessible to the de-duplicator; and
updating an expedited data structure associated with the selected partition in the global index to include the hash value computed from the unique chunk; and where selectively indexing the relationship chunk comprises:
  storing a hash value computed from the relationship chunk in one or more of, a partitioned sequence index, a partitioned location index, and a partitioned relation index; and
  updating one or more expedited data structures associated with the one or more partitions in the one or more indexes into which the hash value is stored to include the hash value computed from the relationship chunk.

17. The article of manufacture of claim 16, the method comprising:
  resolving a duplicate determination for the data de-duplicator based on determining whether a candidate hash provided by the data de-duplicator is located in one or more of, the ordered optimization index, and the global index;
  where determining whether the candidate hash is located in the ordered optimization index comprises first determining whether the candidate hash is not located in the ordered optimization index by accessing an expedited data structure associated with the ordered optimization index and, if the ordered optimization index expedited data structure access is equivocal, searching the ordered optimization index for the candidate hash; and
  where determining whether the candidate hash is located in the global index comprises first determining whether the candidate hash is not located in the global index by accessing an expedited data structure associated with the global index and, if the global index expedited data structure access is equivocal, searching the global index for the candidate hash;
  where searching the ordered optimization index for the candidate hash and searching the global index for the candidate hash proceed in parallel, where an unequivocal determination in the ordered optimization index terminates searching the global index, and where an unequivocal determination in the global index terminates searching the ordered optimization index.

18. A memory for storing data for access by an application being executed on a data processing system, comprising:
  a data structure stored in the memory, the data structure storing information used by the application and including:
  a global index storing a complete set of location contexts associated with chunks processed by a data de-duplicator; and
  an ordered optimization index storing an incomplete set of location contexts associated with chunks processed by the data de-duplicator;
  where the global index is a hash tree whose primary key is a hash field, where the global index is partitioned, and where the global index is protected by at least one expedited data filter; and
  where the ordered optimization index comprises:
    a partitioned sequence index arranged as a hash tree and protected by an expedited data filter;
    a partitioned location index arranged as a hash tree and protected by an expedited data filter; and
    a partitioned relation index arranged as a hash tree and protected by an expedited data filter, and
  where the ordered optimization index stores an ordered set of optimizations configured to facilitate resolving a duplicate determination for the data de-duplicator without accessing the global index.

* * * * *